United States Patent
Lilie (10) Patent No.: US 9,335,084 B2
(45) Date of Patent: May 10, 2016

(54) COOLING SYSTEM OF A REFRIGERATOR AND SUCTION SYSTEM FOR A COMPRESSOR FLUID

(75) Inventor: Dietmar Erich Bernhard Lilie, Joinville (BR)

(73) Assignee: Whirlpool S.A., Sao Paulo SP (BR)

( * ) Notice: Subject to any disclaimer, the term of this patent is extended or adjusted under 35 U.S.C. 154(b) by 191 days.

(21) Appl. No.: 13/643,862

(22) PCT Filed: Apr. 26, 2011

(86) PCT No.: PCT/BR2011/000120
§ 371 (c)(1),
(2), (4) Date: Feb. 27, 2013

(87) PCT Pub. No.: WO2011/134030
PCT Pub. Date: Nov. 3, 2011

(65) Prior Publication Data
US 2013/0160482 A1 Jun. 27, 2013

(30) Foreign Application Priority Data

Apr. 26, 2010 (BR) ..................................... 1001359
Apr. 25, 2011 (BR) ..................................... 1001359
Apr. 25, 2011 (BR) ..................................... 1101972

(51) Int. Cl.
*F25B 5/02* (2006.01)
*F04B 39/10* (2006.01)
(Continued)

(52) U.S. Cl.
CPC ................ *F25D 11/02* (2013.01); *F04B 39/06* (2013.01); *F04B 39/10* (2013.01); *F25B 5/02* (2013.01);
(Continued)

(58) Field of Classification Search
CPC .......... F25B 5/02; F25B 41/04; F25B 41/043; F25B 1/02; F25B 1/10; F25B 2600/2507; F25B 2600/2511; F25B 2600/0251; F25B 2313/02331; F25D 11/02; F25D 11/022; F04B 39/06; F04B 39/10; Y02B 40/32
USPC ............ 417/442, 302, 493, 503; 62/198, 199, 62/200, 422
See application file for complete search history.

(56) References Cited

U.S. PATENT DOCUMENTS 2,123,497 A * 7/1938 Buchanan ........................ 62/200
2,333,899 A 11/1943 Stickel
(Continued)

FOREIGN PATENT DOCUMENTS

CH 271484 A 10/1950
DE 2913167 A1 10/1979
(Continued)

OTHER PUBLICATIONS

Trinkel, Directional Control Valves, 2008, http://hydraulicspneumatics.com/other-technologies/book-2-chapter-8-directional-control-valves.*

(Continued)

*Primary Examiner* — Devon Kramer
*Assistant Examiner* — Nathan Zollinger
(74) *Attorney, Agent, or Firm* — Brian J. Colandreo, Esq.; Jeffrey T. Placker, Esq.; Holland & Knight LLP (57) ABSTRACT

The present invention relates to a cooling system of a refrigerator, particularly of a refrigerator including a refrigeration compartment and a freezer comprising a compressor attached to at least one condenser by a segment of a refrigerant tube, wherein a first refrigerant line leaves from the condenser and returns to the compressor, and a second refrigerant line leaves from the condenser and returns to the compressor. In the preferred embodiment of the present invention, the compressor has at least two suction inlets, wherein the first refrigerant line is connected to the first inlet and the second refrigerant line is connected to the second inlet, and both inlets have each a suction valve. In the optional embodiment of the present invention, the fluid compressor comprises at least one fluid selection device directly connected to the at least one suction inlet, and the fluid selection device receives at least two supply lines, and is able to selectively switch pressurized fluid from one of them, to the suction inlet of the fluid compressor.

5 Claims, 8 Drawing Sheets

(51) Int. Cl.
*F25D 11/02* (2006.01)
*F04B 39/06* (2006.01)
*F25B 1/02* (2006.01)
*F25B 41/04* (2006.01)

(52) U.S. Cl.
CPC ............... *F25B 1/02* (2013.01); *F25B 41/043* (2013.01); *F25B 2600/0251* (2013.01); *F25B 2600/2507* (2013.01); *F25D 11/022* (2013.01); *Y02B 40/32* (2013.01)

(56) References Cited

U.S. PATENT DOCUMENTS

| | | | |
|---|---|---|---|
| 2,481,605 A | | 9/1949 | MacLeod |
| 2,976,698 A | | 3/1961 | Muffly |
| 3,108,453 A | | 10/1963 | Tinkey |
| 3,759,057 A | * | 9/1973 | English .................. F04B 49/16 417/292 |
| 4,184,341 A | | 1/1980 | Friedman |
| 4,373,870 A | * | 2/1983 | Pandzik ................. F04B 49/24 417/269 |
| 4,622,828 A | | 11/1986 | Fujiwara et al. |
| 5,531,078 A | * | 7/1996 | Day et al. .................. 62/199 |
| 7,114,349 B2 | * | 10/2006 | Lifson et al. .................. 62/513 |
| 2008/0120985 A1 | | 5/2008 | Lee et al. |
| 2013/0160482 A1 | * | 6/2013 | Lilie ............................ 62/441 |
| 2014/0023524 A1 | * | 1/2014 | Maass et al. ................. 417/53 |

FOREIGN PATENT DOCUMENTS

| | | |
|---|---|---|
| EP | 1087142 A2 | 3/2001 |
| EP | 1783443 A1 | 5/2007 |
| JP | 6048463 A | 3/1985 |
| JP | 6172966 A | 4/1986 |
| JP | 2008512641 A | 4/2008 |
| WO | 2006/062860 A2 | 6/2006 |

OTHER PUBLICATIONS

International Search Report and Written Opinion for PCT/BR2011/000120 mailed Apr. 23, 2012.
International Preliminary Report on Patentability for PCT/BR2011/000120 dated Mar. 5, 2013.
Machine translation of CH 271484 abstract. 3 pages.
Non-Final Office Action issued in related U.S. Appl. No. 14/511,455 on Jun. 29, 2015.
Decision of Refusal Office Action dated Feb. 9, 2016, received in JP Patent Application No. 2013-506415, pp. 1-4.

\* cited by examiner

COOLING SYSTEM OF A REFRIGERATOR AND SUCTION SYSTEM FOR A COMPRESSOR FLUID

CROSS-REFERENCE TO RELATED APPLICATIONS

This application is the U.S. National Stage of International (PCT) Patent Application No. PCT/BR2011/000120, filed on Apr. 26, 2011, which claims priority to Brazilian Patent Application No. PI1001359-8, filed on Apr. 26, 2010, which also claims priority to both Brazilian Application (Provisory) Nos. 018110015148 and 018110015157, filed on Apr. 25, 2011, respectively. The entire disclosures of these applications are incorporated herein by reference in their entireties.

FIELD OF THE INVENTION

The present invention relates to a cooling system of a refrigerator, particularly in a domestic refrigerator having a cooling compartment and a freezer, and also to a process to operate the system. The present invention also relates to a suction system of the fluid compressor in the cooling herein disclosed.

BACKGROUND OF THE INVENTION

It known that a cooling system basically comprises a compressor, a condenser, an expansion device and an evaporator. The refrigerant (in its gaseous phase) is compressed in the compressor and flows to the condenser, where it is cooled, for example, by the air, and passes to the liquid phase. The refrigerant in high pressure, flows to the expansion device, where its pressure is reduced, and then flows to the evaporator and absorbs heat from the load (for example, food) and passes into the gas phase. Finally, the refrigerant is sucked by the compressor, thus completing the refrigeration cycle.

It is known various types of refrigeration systems of household refrigerators. The most commonly used cooling systems comprise a compressor and a condenser, from where a refrigerant line leaves to the evaporator of the freezer, and then this line passes through the evaporator of the refrigeration compartment and returns to the compressor.

Although the system described above has lower costs, it is inefficient since it operates at lower temperatures, i.e. at the temperature of the freezer.

In other cooling systems of the prior art there are two completely independent systems, one operating in the freezer and the other operating in the refrigeration compartment. This configuration provides a good efficiency, although its cost is very high, since it has two compressors and two capacitors.

An alternative to these cooling systems is described in document U.S. Pat. No. 5,531,078, which discloses a system especially suitable for use in a dual evaporator refrigeration cycle (having at least two independent climate chambers). This system uses only one fluid compressor provided with a single suction inlet and a single pressured outlet. The suction inlet is supplied by a suction system that consists of a single main suction line, which comes from the junction of two intermediate suction lines. The above suction lines are also known as return lines (thus, the suction system described in document U.S. Pat. No. 5,531,078 provides two intermediate return lines and a return final line).

Figure 1:
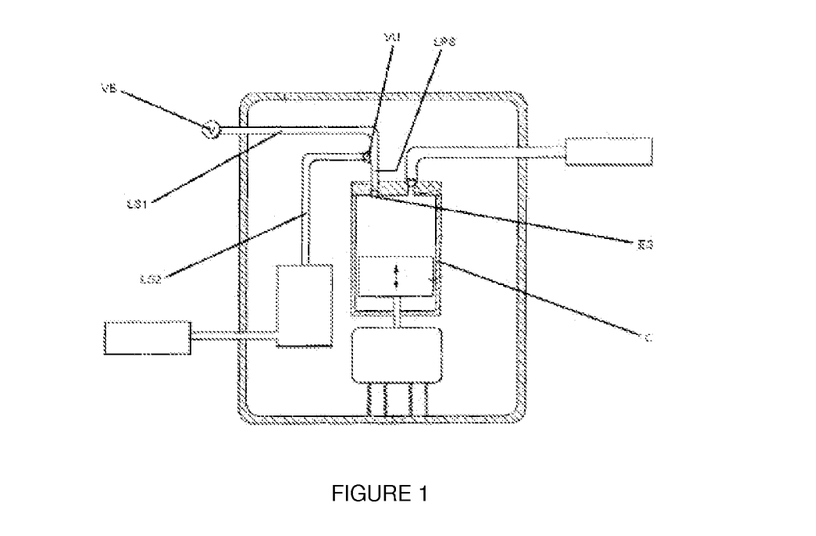
FIG. 1—schematically and briefly illustrates the suction system of the cooling refrigeration system described in document U.S. Pat. No. 5,531,078 (with the indicative references previously mentioned)

The cooling system described in document U.S. Pat. No. 5,531,078 is best illustrated in FIG. 1, wherein it becomes possible to verify that the union of the two intermediate suction lines "LIS1" and "LIS2" occurs with the aid of a one-way valve "VU" resulting in a single main suction line "LPS", which is connected to the suction inlet "ES" of the compressor "C". Also according to FIG. 1, it can be verified that at least one of the two intermediate suction lines "LIS1" or "LIS2" has a check valve (on-off) "VB".

The operation of the suction system of the refrigeration system described in document U.S. Pat. No. 5,531,078 is simple: the intermediate suction line "LIS1" of higher pressure (which has a check-valve "VB") supplies the main suction line "LPS", which supplies the compressor "C". Currently, the unidirectional valve "VU" prevents the pressure in the intermediate suction line "LIS1" to invade the intermediate suction line "LIS2", which has a lower pressure. Therefore, the compressor C is supplied with "high pressure". When the check-calve "VB" interrupts the pressure of the intermediate suction line "LIS1", the low pressure of the main suction line "LIS2" flows through the unidirectional valve "VU" to the main suction line "LPS", and consequently, to the compressor "C". This type of suction system allows that a single compressor with a single suction inlet to be capable of working with two different pressures. This also allows the compressor "C" to work at high and low pressures in alternating cycles, optimizing its energy ratio (compared to other arrangements existing in the state of the art).

However, the suction system of the refrigeration system described in document U.S. Pat. No. 5,531,078 has a major drawback: the occurrence of parasite volume of high pressure/low pressure in the beginning of the low pressure/high pressure cycles. This parasite volume occurs mainly by the fact that when the check valve "VB" is actuated (which occurs when it is desired to alternate the cycles of high and low pressure), the intermediate suction line LIS1 or the main suction line "LPS" is pressurized with the pressure opposite to the desired working pressure. That is, upon alternating from high pressure to low pressure, the intermediate suction line "LIS1" remains pressurized, and, therefore, part of the cycle to be supplied at low pressure is still being supplied at high pressure. Moreover, upon alternating from low pressure to high pressure, the main suction line "LPS" remains pressurized at low pressure, and, therefore, part of the cycle to be supplied at high pressure is still being supplied at low pressure. This negative feature is inadmissible in application where the cycles alternating rate (high pressure and low pressure) is high and not fixed, since the occurrence of parasite volume at high pressure/low pressure will be constant.

It can also be observed that, more broadly and generally speaking, another drawback of all systems of the prior art consists in the fact that they always operate within temperature ranges, i.e., when the temperature reaches a preset maximum value, the thermostat sends a signal to stop the compressor operation or reduces its rotation (in the case of variable capacity compressors), and when the temperature reaches the lowest value, the system returns to operating at full capacity. These variations also cause high losses.

OBJECTIVES AND ADVANTAGES OF THE PRESENT INVENTION

The present invention has the objective to provide a cooling system for household refrigerators having a high efficiency at a low cost.

Another objective of the present invention is to provide a suction system for fluid compressors into which there is no occurrence of parasite volume of high pressure/low pressure during cycles of alternation between high and low pressure. In this context, it is also an objective of the present invention to provide a suction system for fluid compressor capable of operating at a high frequency of alternating cycles of high and low pressure.

The cooling system described herein comprises a compressor associated to at least a condenser of a refrigeration system by a segment of a refrigerant discharge tube, wherein a first refrigerant line leaves from the condenser and returns to the compressor and a second refrigerant line leaves from the condenser and returns to the compressor.

Thus, the system according to the present invention can operate in a traditional manner, wherein each suction line operates sequentially at a low speed or, preferably, in a very fast rate in which the exchange operation of a suction line to another suction line is processed in a very fast manner, so that the system interprets as if the two lines were operating simultaneously.

This feature of rapidly exchanging the lines provides high efficiency to the system, causing the refrigerator compartment and freezer operate simultaneously in nearly constant temperatures. Thus, the known losses of the prior art systems, which operate based on temperature ranges, as previously described, can be avoided.

Another advantage of the system according to the present invention is the fact that you can control the time into which each line is activated, which enables control of the capacity required for each of them. This valve opening time control can be associated with a variable capacity compressor. This combination allows to cover a wide range of capabilities for each suction line, with full control of the capacity of each suction line, in an independent and concurrent manner.

Another advantage of the system according to the invention is the fact that there is no segment of the suction lines subject to two operating pressures, as occurs in the prior art system shown in FIG. 1. In view of this, the losses described above can be eliminated.

In reciprocating or linear hermetic compressors applied to household refrigeration systems, the compressor suction is usually equalized with the compressor housing. Thus the housing has the same suction pressure and in cases wherein compressors use oil for lubricating its bearings, it can easily return to the crankcase. Thus, another advantage of the system according to the invention is the fact that you can choose from one of the suction lines to be equalized with the interior of the housing and also allow oil coming in this line to return to the crankcase. The oil returning by the non-equalized line will be pumped back into the discharge line, where it will mix with the gas coming from the other suction line and part will be moved to the crankcase when returning to the compressor through the equalized suction line. Thus, there will always be a way for the oil to return to the compressor. In compressors where lubricating oil is not used, the two lines could be hermetic if so desired.

SUMMARY OF THE INVENTION

The present invention discloses, according to its preferred embodiment, a cooling system of a refrigerator, particularly of a refrigerator including a refrigeration compartment and a freezer, said system comprising a compressor attached to at least one condenser by a segment of a refrigerant discharge tube, a first refrigerant line leaving from the condenser and returning to the compressor (said first line sequentially carrying an expansion device and an evaporator arranged in the refrigeration compartment), and a second refrigerant line leaving from the condenser and returning to the compressor (said second line sequentially carrying an expansion device and an evaporator arranged in the freezer). The compressor has at least two suction inlets, wherein the first refrigerant line is connected to the first inlet and the second refrigerant line is connected to the second inlet, and both inlets have each a suction valve.

The suction valve of the first suction inlet is a remotely actuated valve, and preferably, a solenoid valve or a pneumatic valve or a hydraulic valve. The suction valve of the second suction inlet is a mechanically operable valve. The first and second suction valves operate alternately, wherein the alternation operation of the valves occurs preferably quickly.

The respective expansion devices of the first and second refrigerant lines are preferably capillary tubes.

At least one inlet line is hermetically coupled to the compression chamber of the compressor. At least one inlet line is equalized to the volume of the compressor housing. At least one inlet nozzle is spaced from the compressor housing and has at least one end remote from its respective inlet line.

The present invention also shows, according to its optional embodiment, a suction system for fluid compressor capable of association with a fluid compressor and comprising at least one fluid selection device directly connected to at least one suction inlet of the fluid compressor. The said fluid selection device receives at least two supply lines and is capable to selectively switch the pressurized fluid from one of the at least two supply lines to the suction inlet of the fluid compressor. The fluid selection device comprises at least one fluid outlet channel and at least two fluid inlet channels. The fluid selection device comprises a pneumatic directional three-way/two positions valve. More preferably, the actuation of the fluid selection device is electric, via a solenoid. Optionally, the fluid selection device comprises an interconnection of a simple directional valve—on/off—with a one-way valve.

Each one of the fluid inlets of the fluid selection device receives a single supply line, and each supply line has its own internal pressure that is different from the internal pressure of the other supply lines. Preferably, at least one of the supply lines is hermetic. Also preferably, at least one of the supply lines is equalized with the pressure of the fluid compressor housing.

DETAILED DESCRIPTION OF THE INVENTION

Preferred Embodiment

Figure 2:
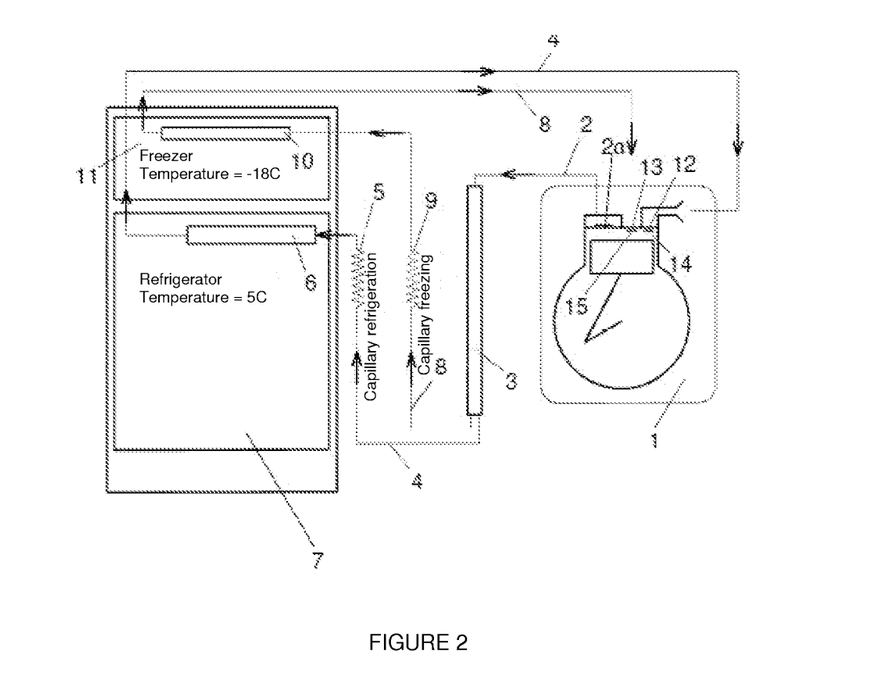
FIG. 2 shows a preferred embodiment of the refrigeration system in accordance with the invention.

FIG. 2 shows the system according to the invention, wherein a compressor 1 is attached to a condenser 3 by a segment of a refrigerant discharge tube 2, said segment leaving from a discharge valve 2a. It can be observed a first refrigerant line 4 having an expansion device 5 and an evaporator 6 arranged in the cooling compartment 7, as well as second refrigerant line 8 having an expansion device 9 and an evaporator 10 arranged in the freezer 11. Preferably, the expansion devices are capillary tubes. The compressor 1 has two suction inlets 12 and 13, wherein the first refrigerant line 4 is connected to the first inlet 12 and the second refrigerant line 8 is connected to the second inlet 13. The pressure is greater in the first refrigerant line 4 than in the second line 8.

A remotely actuated suction valve 14 is arranged in the first suction inlet 12, the remotely actuated suction valve being preferably a solenoid valve. Thus, during operation, the solenoid valve opens and refrigerant of line 4, which is at a higher pressure, occupies the compression chamber and prevents the opening of the another suction valve 15 disposed in the second suction inlet 13. Then the solenoid valve 14 closes and the refrigerant is compressed and flows through the discharge tube 2. After this step, the solenoid valve 14 remains closed and the valve 15 opens, thereby allowing the refrigerant in the second line 8 to be sucked and subsequently compressed and discharged.

As previously mentioned, the operation exchange of a suction line to another is preferably done very quick, and thus, the system interprets as if the two lines were operating simultaneously, which allows the operation of the system without the use of temperature ranges, with a nearly constant temperature in the freezer, for example −18° C., and a constant temperature within the cooling compartment, for example 5° C.

Figure 3:
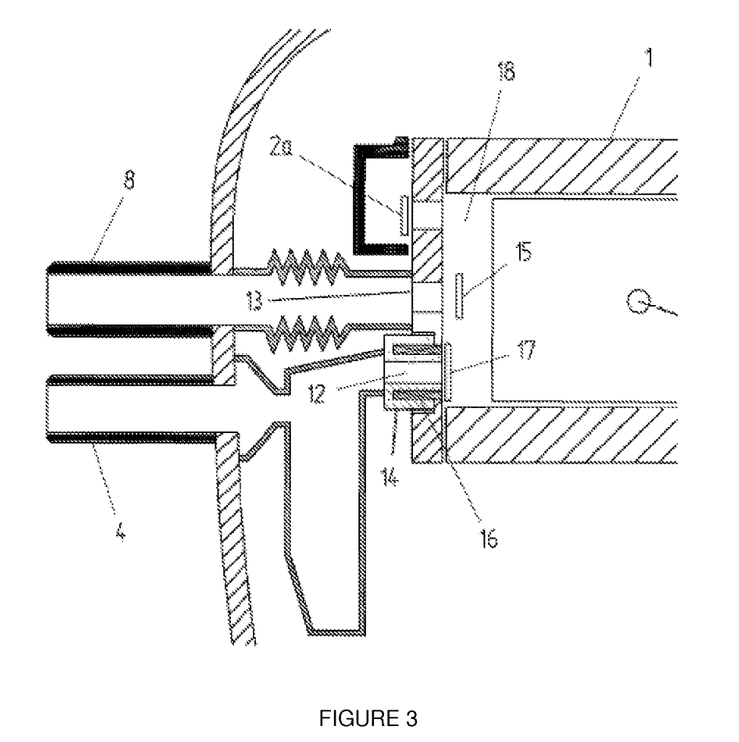
FIG. 3 shows a first embodiment of the remotely actuated suction valve of the system according to the invention, in the closed state.

FIG. 3 shows a first embodiment of the remotely actuated valve 14, consisting of a solenoid valve disposed on the suction inlet 12. This figure shows that the coil 16 of the valve is mounted in the interior of the suction inlet 12 and the counter-seat 17 of the valve is inside the compression chamber 18, in closed condition/state. In this condition, the coil 16 is actuated, thereby preventing the opening of the solenoid valve 14, and, thus, enabling the opening of the valve 15 as shown in this figure.

Figure 4:
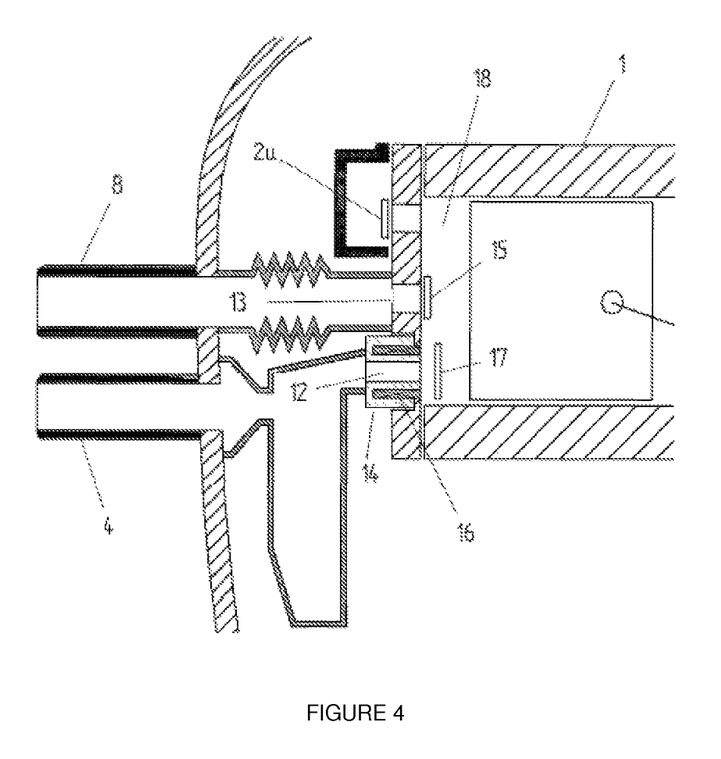
FIG. 4 shows the same view of FIG. 3 but with the remotely actuated suction valve in the open state.
Figure 5:
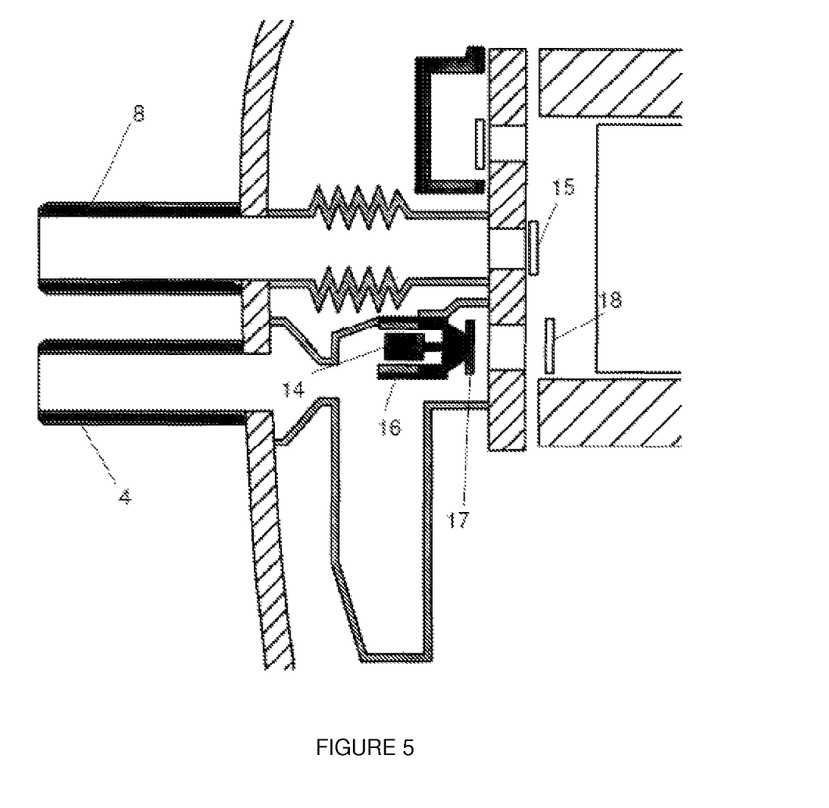
FIG. 5 shows a second embodiment of the remotely actuated suction valve of the system according to the invention in the open state.

FIG. 4 shows the same view of FIG. 3, but in this figure the coil 16 is not energized and the solenoid valve 14 is open, thus preventing the opening of the suction valve 15. FIG. 5 shows a second embodiment of the solenoid valve 14, wherein the coil 16 is mounted on the first refrigerant line 4 and the counter-seat 17 of the valve operates outside the compression chamber 18. This embodiment has the advantage of using a smaller space inside the cylinder, since the electromagnetic circuit is located in the suction line. It can also be observed in the figure that the solenoid valve 14 is in the open condition while the suction valve 15 is closed. While the valve 17 is open, the suction valve 18 can open and close several times.

Figure 6:
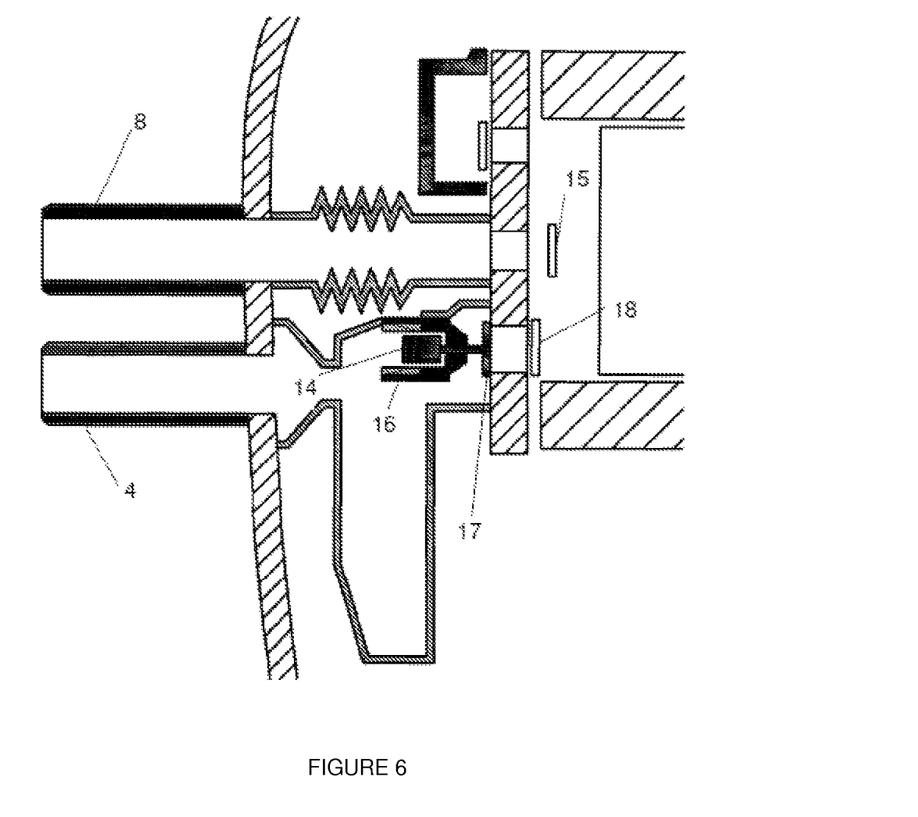
FIG. 6 shows the valve of FIG. 5 in the closed state.

FIG. 6 shows the valve of FIG. 5 in the closed condition, that is, with a counter seat 17 closing the suction inlet 12, while the suction valve 15 is open.

Figure 7:
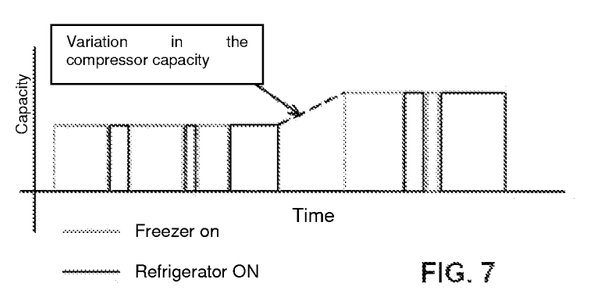
FIG. 7 shows an operating chart of the system in accordance with the present invention, wherein a variable capacity compressor is used.
Figure 8:
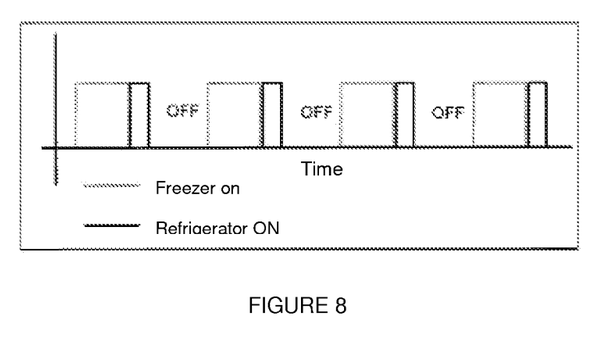
FIG. 8 shows an operating chart of the system in accordance with the invention, wherein a fixed capacity compressor is used.

FIGS. 7 and 8 show charts of capacity and operating time of compressor used in the system according to the invention, wherein FIG. 6 shows the operation of a variable capacity compressor and FIG. 7 shows the operation of a fixed capacity compressor. As is already known, the variable capacity compressor operates continuously, without interruptions, only increasing or decreasing its speed according to the need for operation, while the fixed capacity compressor stops its operation at certain intervals, according to the sections indicated with "off" in FIG. 7. Considering that in the present invention the freezer and refrigeration compartment operate with fairly constant temperatures, the stop intervals of the fixed capacity compressor are greatly reduced.

In addition to previously described embodiment, the same inventive concept can be applied to other alternatives or possibilities of using the invention. For example, the system according to the present invention can employ any type of compressor and not only the linear compressor shown in figures. In another example, the system could have multiple suction inlets of multiple compartments with different operating temperatures.

Figure 9:
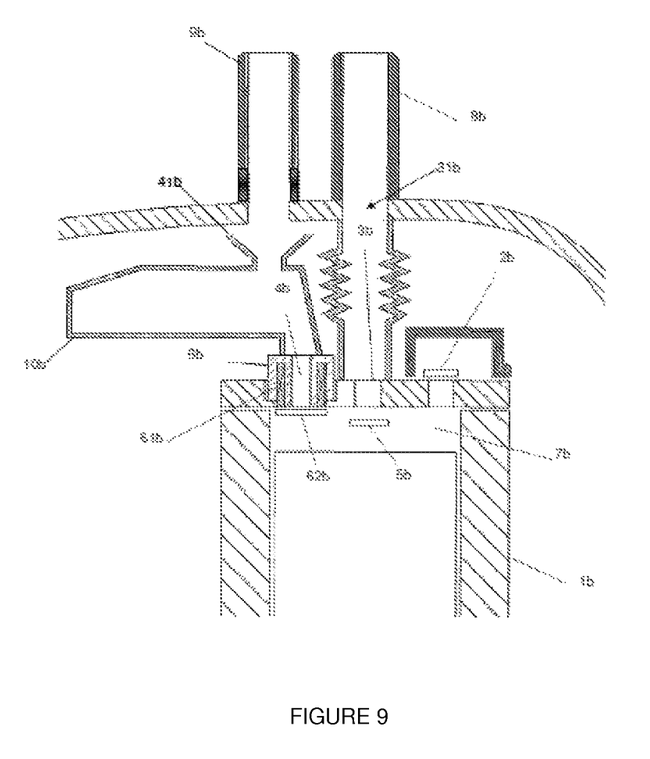
FIG. 9 shows an enlarged detail of a compressor including a suction inlet equalized with the housing compressor (in addition to other hermetic suction inlet)

FIG. 9 shows an enlarged detail of a compressor including a suction inlet equalized with the compressor housing, wherein a compressor 1b is provided with three nozzles: one outlet nozzle provided with a discharge valve 2b for connection of a refrigerant discharge tube (not shown), an inlet nozzle 3b connected to a hole 31b of the compressor housing 1b, and a second inlet nozzle 4b not connected to the compressor housing 1b. In the inlet nozzle 3b there is a suction valve 5b. In the inlet nozzle 4b there is a solenoid valve 6b internally containing a coil 61b and a counter seat 62b located inside the compression chamber 7b.

The first refrigerant line 8b hermetically couples to the hole 31b of the housing and to the compressor 1b.

The second refrigerant inlet 9b couples to the housing without establishing a physical connection with the end 41b of the inlet nozzle 4b. This configuration allows the pressure equalization between the refrigerant inlet 9b and the compressor housing 1b.

It should be emphasized that regardless of the amount of inlet lines that may exist in the system, according to the development herein contemplated, at least one of the inlets of at least one of these lines will have a similar configuration to the configuration of the second refrigerant inlet 9b (to allow the pressure equalization and the eventual return of the lubricating oil existing in the inlet line into the interior the housing).

Optional Embodiment

In accordance with the objectives of the present invention, it is also presented an optional version of the embodiment previously described.

Figure 10:
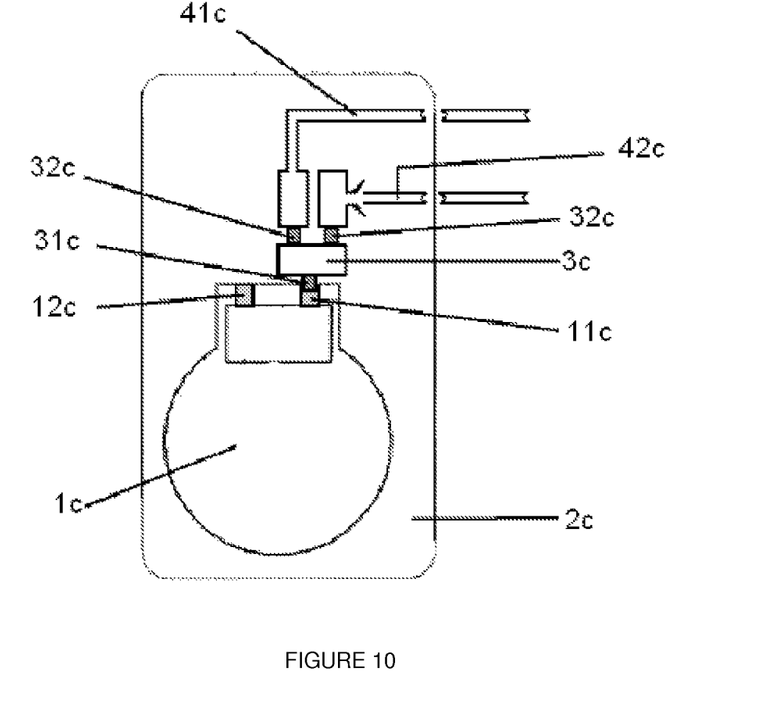
FIG. 10 also schematically shows an optional embodiment of the suction system for fluid compressors.

According to this optional embodiment, and as illustrated in FIG. 10, it is shown a suction system for fluid compressor having only one suction inlet. This suction system allows a compressor having only one suction inlet to operate similarly to the compressor having two suction inlets previously described, and therefore, the suction system for fluid compressor may also be implemented in a cooling system of a refrigerator, particularly of a household refrigerator having a refrigerator compartment and a freezer. However, the suction system for fluid compressor has no limitation of use applications.

The suction system for fluid compressor is schematically illustrated in FIG. 10. In this figure it can be seen that the fluid compressor 1c, which is preferably of the electrical type, is housed within the crankcase 2c, and has at least one suction inlet 11c and at least one fluid outlet 12C.

Also according to FIG. 10, it should be noticed that the suction system for fluid compressor itself comprises at least one fluid selection device 3c, which provides at least one fluid outlet channel 31c and at least two fluid inlet channels 32c.

The fluid output 31c of the fluid selection device 3c is directly connected to one of the at least one suction inlets 11c of the fluid compressor 1c.

Each one of the fluid inlets 32c receives a single line and/or fluid tube 41c, 42c. Each one among the lines and/or fluid tubes 41c, 42c has an own internal pressure and preferably different from the internal pressure of the other lines and/or fluid tubes 41c, 42c. This allows the fluid compressor 1c to work with different supply pressures.

The fluid selection device 3c comprises a pneumatic directional three-way/two position valve, electrically driven via a solenoid. Preferably, the solenoid is remotely actuated.

The line and/or tubing 41C (high pressure) is connected to any of the fluid inlet channels 32c, while the line and/or tubing 42c (low pressure) is connected to the other fluid inlet channel 32c. It should again be noted that the fluid outlet channel 31c of the fluid selection device 3c is directly connected to at least one suction inlet 11c of the fluid compressor 1c.

Preferably, one of the lines and/or tubing 41c, 42c is hermetic (with pressurized fluid isolated from the external environment), while the other line and/or tubing 41c, 42c is equalized with the housing of the fluid compressor 1c.

The operation of the suction system for fluid compressor herein proposed is as follows: the fluid selection device 3c, when actuated, selectively directs the pressurized fluid from one of the lines or tubes 41c, 42c into the fluid compressor 1c, wherein the conventional process of compression and exhaustion of the pressurized fluids occurs.

The direct connection between the fluid outlet 31c of the fluid selection device 3c and a suction inlet 11c of the fluid compressor 1c annuls any possibility of parasite volume at high pressure/low pressure during the alternating cycles of high and low pressure. This allows that the fluid selection device 3c can be repeatedly actuated in a short period of time, driven the switching (in high frequency) of the working pressure, which is selectively obtained through the lines and/or tubes 41c, 42c.

Optionally, the fluid selection device 3c can further comprise (instead of pneumatic directional three-way/two positions valve), an interconnection of a simple directional valve (on/off) with a unidirectional valve. Preferably, the simple directional switching valve is accomplished via a solenoid by remote actuation.

Again, it is important to emphasize that the interconnection of a simple directional valve (on/off) with a unidirectional valve (having at least two inlet channels and one outlet channel) is directly connected to at least one suction inlet 11c of fluid compressor 1c.

Having described specific examples of the present invention, it should be understood that the scope it covers other possible variations, being limited solely by the wording of claims, including the possible equivalents therein.

The invention claimed is:

1. A cooling system of a refrigerator including a refrigeration compartment (7) and a freezer (11), a compressor (1), a first line (4) sequentially carrying a first expansion device (5) and a first evaporator (6) arranged in the refrigeration compartment (7), a second line (8) sequentially carrying a second expansion device (9) and a second evaporator (10) arranged in the freezer (11), wherein the compressor (1) has at least two suction inlets (12, 13) both inlets each having a suction valve (14, 15);
   the suction valve (14) of the first suction inlet (12) is a remotely actuated valve, the remotely actuated valve is a solenoid valve;
   the suction valve (15) of the second suction inlet (13) is a mechanically operable valve; and
   the first and second suction valves (14, 15) operate in an alternate manner;
   the alternation operation of the suction valves (14, 15) occurs at a speed such that the cooling system interprets the first line (4) and the second line (8) as operating simultaneously;
   both suction valves (14, 15) being disposed at cylinder-head, within a compressor crankcase (2c).

2. A suction system for a fluid compressor comprising:
   at least one fluid selection device (3c) comprising at least two inlet channels (32c) and at least one fluid outlet channel (31c);
   each one of the fluid inlet channels (32c) receiving fluid from a respective supply line (41c, 42c);
   the supply lines (41c, 42c) being disposed in parallel, each one being associated with a respective evaporator (6, 10);
   each supply line (41c, 42c) comprising its own internal pressure which is different from the internal pressure of the other supply line (41c, 42c);
   the fluid outlet channel (31c) being directly connected to at least one suction inlet (11c) of the fluid compressor (1c);
   the fluid selection device (3c) being able to selectively switch pressurized fluid from one of the two supply lines (41c, 42c) to the suction inlet (11c) of the fluid compressor (1c), wherein the fluid selection device (3c) is disposed inside the crankcase (2c).

3. A system according to claim 2, wherein the fluid selection device (3c) comprises a pneumatic directional three-way/two positions valve.

4. A system according to claim 2, wherein the actuation of the fluid selection device (3c) is electric, via a solenoid.

5. A system according to claim 2, wherein the fluid selection device (3c) comprises an interconnection of a simple directional valve on/off with a one-way valve.

* * * * *